(12) United States Patent
Miyazaki et al.

(10) Patent No.: US 7,090,058 B2
(45) Date of Patent: Aug. 15, 2006

(54) DUST COVER RECEIVING STRUCTURE OF SHOCK ABSORBER

(75) Inventors: Tomohiro Miyazaki, Saitama (JP); Yuzo Niina, Aichi (JP)

(73) Assignees: Showa Corporation, Saitama (JP); Mitsubishi Jodosha Kogyo Kabushiki Kaisha, Tokyo (JP)

( * ) Notice: Subject to any disclaimer, the term of this patent is extended or adjusted under 35 U.S.C. 154(b) by 94 days.

(21) Appl. No.: 10/437,503

(22) Filed: May 14, 2003

(65) Prior Publication Data
US 2003/0218286 A1 Nov. 27, 2003

(30) Foreign Application Priority Data
May 24, 2002 (JP) ............................. 2002-151608

(51) Int. Cl.
*F16F 9/38* (2006.01)
(52) U.S. Cl. .................. 188/322.12; 267/179; 267/221
(58) Field of Classification Search ........... 188/322.12; 267/33, 170, 179, 221; 280/124.147, 124.146, 280/124.151
See application file for complete search history.

(56) References Cited
U.S. PATENT DOCUMENTS
5,676,355 A * 10/1997 Hayashi et al. ............. 267/221
5,944,154 A * 8/1999 Pees et al. .................. 188/315
6,182,953 B1 * 2/2001 Smith et al. ................ 267/220
6,199,845 B1 * 3/2001 Rispeter et al. ............. 267/221
6,254,072 B1 * 7/2001 Bono et al. ................. 267/220
6,260,836 B1 * 7/2001 Aoyama et al. ............ 267/221
2003/0209395 A1 * 11/2003 Fukaya ................. 188/322.12

FOREIGN PATENT DOCUMENTS
FR 2 660719 * 10/1991
JP 3205480 3/1995
JP 2002-31181 * 1/2002

OTHER PUBLICATIONS
Japanese Utility Model Registration Publication No. SHO 61-139804.
Japanese Utility Model Registration Publication No. SHO 60-173735.

* cited by examiner

Primary Examiner—James McClellan
Assistant Examiner—Bradley King
(74) Attorney, Agent, or Firm—Orum & Roth LLC

(57) ABSTRACT

A dust cover receiving structure of a hydraulic shock absorber 10 is disclosed in which a cover-receiver 50 receiving an end surface of a dust cover 30 is disposed on an upper surface of a spring seat 21. The cover-receiver 50 is fitted and fixed to an engaging portion 21C provided on the spring seat 21 without holding a damper tube 11.

12 Claims, 5 Drawing Sheets

DUST COVER RECEIVING STRUCTURE OF SHOCK ABSORBER

BACKGROUND OF THE INVENTION

1. Field of the Invention

The present invention relates to a dust cover receiving structure of a shock absorber.

2. Description of the Related Art

Japanese Utility Model Applications Laid-open No. S60-173735, S61-139804 and Japanese Patent No. 3205480 disclose a hydraulic shock absorber in which a damper tube is covered with a dust cover, a suspension spring provided outside the dust cover is supported by a spring seat mounted to the damper tube, and a cover-receiver for receiving an end surface of the dust cover is disposed on an upper surface of the spring seat.

In Japanese Utility Model Application Laid-open No. S60-173735, the cover-receiver which is independent from the spring seat is inserted and fixed such that the cover-receiver holds the damper tube. The cover-receiver holds the damper tube and fixes the same under pressure. The required assembling force in which the cover-receiver is inserted into the damper tube and-slides with respect to the damper tube becomes greater, the sliding distance of the cover-receiver with respect to the damper tube is long, and the resulting assembling performance is inferior. Since the cover-receiver is not fixed to the spring seat, there is an adverse possibility that the cover-receiver is deformed or deviated out of position by a collision force against an end surface of the dust cover. The cover-receiver may scratch off the coating on the surface of the spring seat, and rust may be generated on the surface of the spring seat.

According to Japanese Utility Model Application Laid-open No. S61-139804, a radial cover-receiver which is integrally provided with a seat rubber is arranged to hold the damper tube, and the cover-receiver is arranged to extend along an upper surface of the spring seat. This cover-receiver also holds the damper tube and fixes the same under pressure. The required assembling force in which the cover-receiver is inserted into the damper tube and slides with respect to the damper tube becomes greater, the sliding distance of the cover-receiver with respect to the damper tube is long, and the resulting assembling performance is inferior. Since the cover-receiver is not fixed to the spring seat, there is an adverse possibility that the cover-receiver is deformed or deviated out of position by a collision force against an end surface of the dust cover. The cover-receiver may scratch out the coating on the surface of the spring seat, and rust may be generated on the surface of the spring seat.

According to Japanese Patent No. 3205480, a radial cover-receiver which is integrally provided with a seat rubber is provided such that the cover-receiver floats from an upper surface of the spring seat. Since this cover-receiver floats from the spring seat, foreign matter such as sand may be sandwiched between the cover-receiver and the spring seat, and the cover-receiver may be deformed or deviated out of position by a collision force against an end surface of the dust cover. Therefore, there is an adverse possibility that foreign matter such as sand and the cover-receiver scratch off the coating on a surface of the spring seat, and rust may be generated on the surface of the spring seat.

SUMMARY OF THE INVENTION

It is an object of the present invention to enhance the assembling performance of a cover-receiver which receives an end surface of a dust cover, to prevent the cover-receiver and foreign matter such as sand from sliding with respect to a surface of a spring seat, thereby protecting the surface of the spring seat.

Under the circumstances, the invention provides a dust cover receiving structure of a shock absorber comprising a dust cover covered with a damper tube and whose one end is fixed to a piston rod, a suspension spring provided outside the dust cover and supported by a spring seat mounted to the damper tube, and a cover-receiver for receiving the other end surface of the dust cover. The cover-receiver is disposed on an upper surface of the spring seat, and is fitted and fixed to an engaging portion provided on the spring seat without holding the damper tube.

BRIEF DESCRIPTION OF THE DRAWINGS

The present invention will be more fully understood from the detailed description given below and from the accompanying drawings which should not be taken to be a limitation on the invention, but are for explanation and understanding only. The drawings:

FIGS. 3A and 3B show a spring seat, wherein FIG. 3A is a plan view and FIG. 3B is a sectional view;

FIGS. 4A and 4B show a cover-receiver, wherein FIG. 4A is a plan view and FIG. 4B is a sectional view.

DESCRIPTION OF THE PREFERRED EMBODIMENTS

Figure 1:
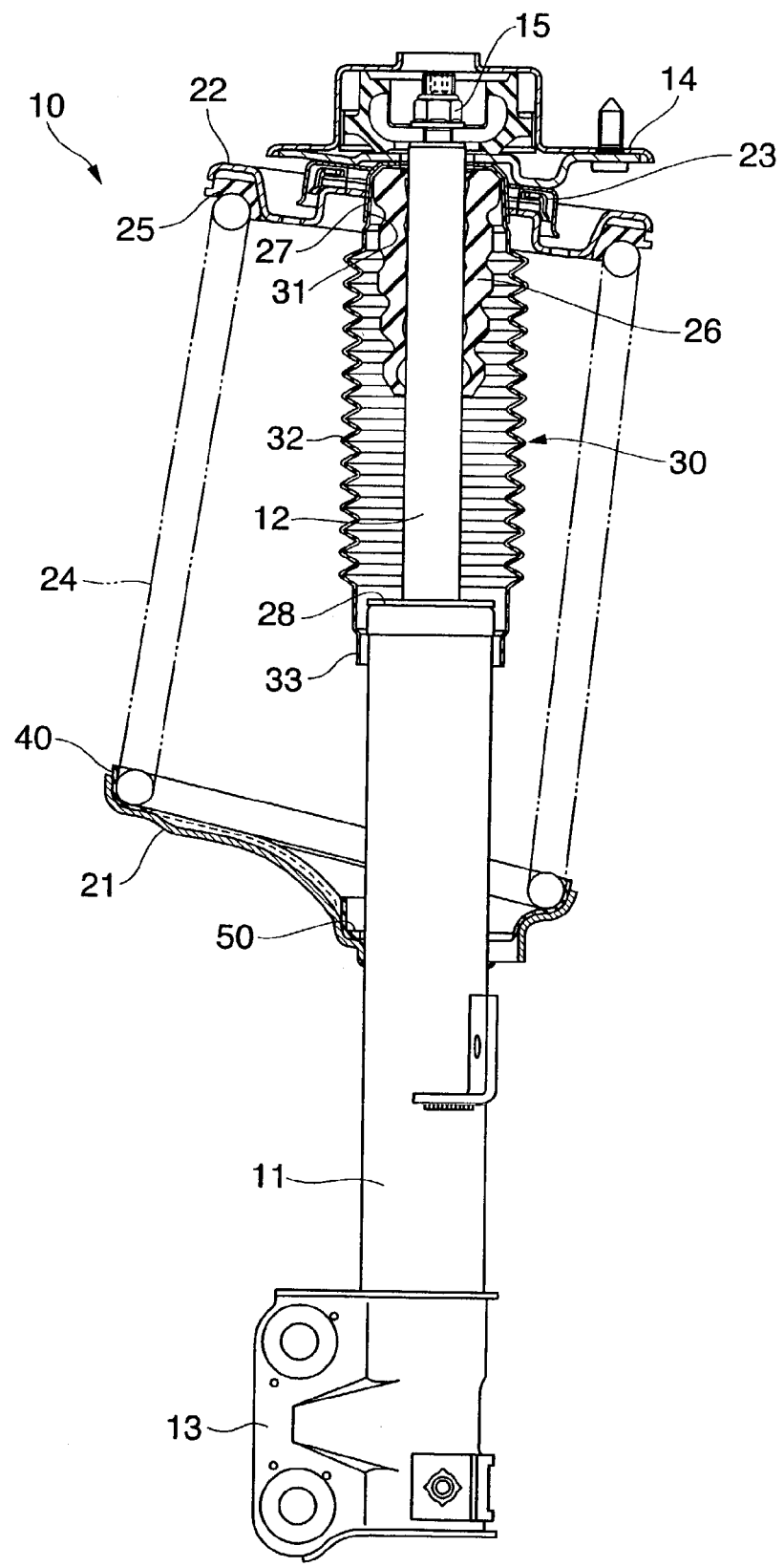
FIG. 1 is a sectional view showing a portion of a hydraulic shock absorber.

As shown in FIG. 1, in a hydraulic shock absorber 10, a piston rod 12 is inserted into a cylinder formed in a damper tube 11. The damper tube 11 is provided with a wheel-side mounting bracket 13 and the damper tube 11 is connected to a wheel. The piston rod 12 projecting from the damper tube 11 is provided with a vehicle body-side mounting bracket 14 and mounted to a vehicle body. The vehicle body-side mounting bracket 14 is a mount rubber assembly, and is fastened to and mounted to an upper end of the piston rod 12 through a nut 15.

The hydraulic shock absorber 10 has a suspension spring 24.

The suspension spring 24 is interposed between a lower spring seat 21 fixed to an outer periphery of the damper tube 11 by welding or the like and an upper spring seat 22. The upper spring seat 22 is disposed around the piston rod 12 and is fixed to a thrust bearing 23 by light press fit to the vehicle body-side mounting bracket 14 such that a back surface of the upper spring seat 22 is supported. The suspension spring 24 is supported by the upper spring seat 22 through a seat rubber 25.

The hydraulic shock absorber 10 includes a bump rubber 26 which is inserted such that the bump rubber 26 holds a portion of the piston rod 12 lower than the vehicle body-side mounting bracket 14. The bump rubber 26 is covered with an iron cup 27 and is restrained against deformation in the radial direction. The iron cup 27 is supported by the vehicle body-side mounting bracket 14 in a backup manner. The hydraulic shock absorber 10 allows the bump rubber 26 to collide against a bump stopper cap 28 on an upper end of the damper tube 11 at the time of maximum compression to limit the maximum compression stroke.

The hydraulic shock absorber 10 expands and contracts such that an impact force that the vehicle receives from a road surface is absorbed by the resilient force of the suspension spring 24. When the piston rod 12 moves vertically due to the expansion and contraction motion of the hydraulic shock absorber 10, the expansion and contraction vibration is swiftly suppressed by the damping force generated by a piston valve device provided in the piston and a base valve device provided in the cylinder.

In the hydraulic shock absorber 10, a dust cover 30 made of an elastic body such as rubber or resin covers the damper tube 11 and the piston rod 12 which projects from the damper tube 11 such that the dust cover 30 surrounds the piston rod 12. The dust cover 30 is held and fixed by the iron cup 27 from above such that the cup-mounting portion 31 covers the bump rubber 26. A bellows portion 32 which is continuously formed with the cup-mounting portion 31 surrounds the bump rubber 26 and the damper tube 11. The dust cover 30 includes a cylindrical hanging portion 33 formed on a lower portion of the bellows portion 32.

The dust cover 30 moves vertically when the piston rod 12 expands and contracts. When the piston rod 12 expands, the dust cover 30 moves a lower end of the hanging portion 33 upward from the lower spring seat 21 to a portion close to the bump stopper cap 28, thereby extending the bellows portion 32. When the piston rod 12 contracts, the dust cover 30 moves the lower end of the hanging portion 33 downward such that the lower end is allowed to collide against a latter-described cover-receiver 50 on the side of the lower spring seat 21, thereby compressing the bellows portion 32.

Figure 2:
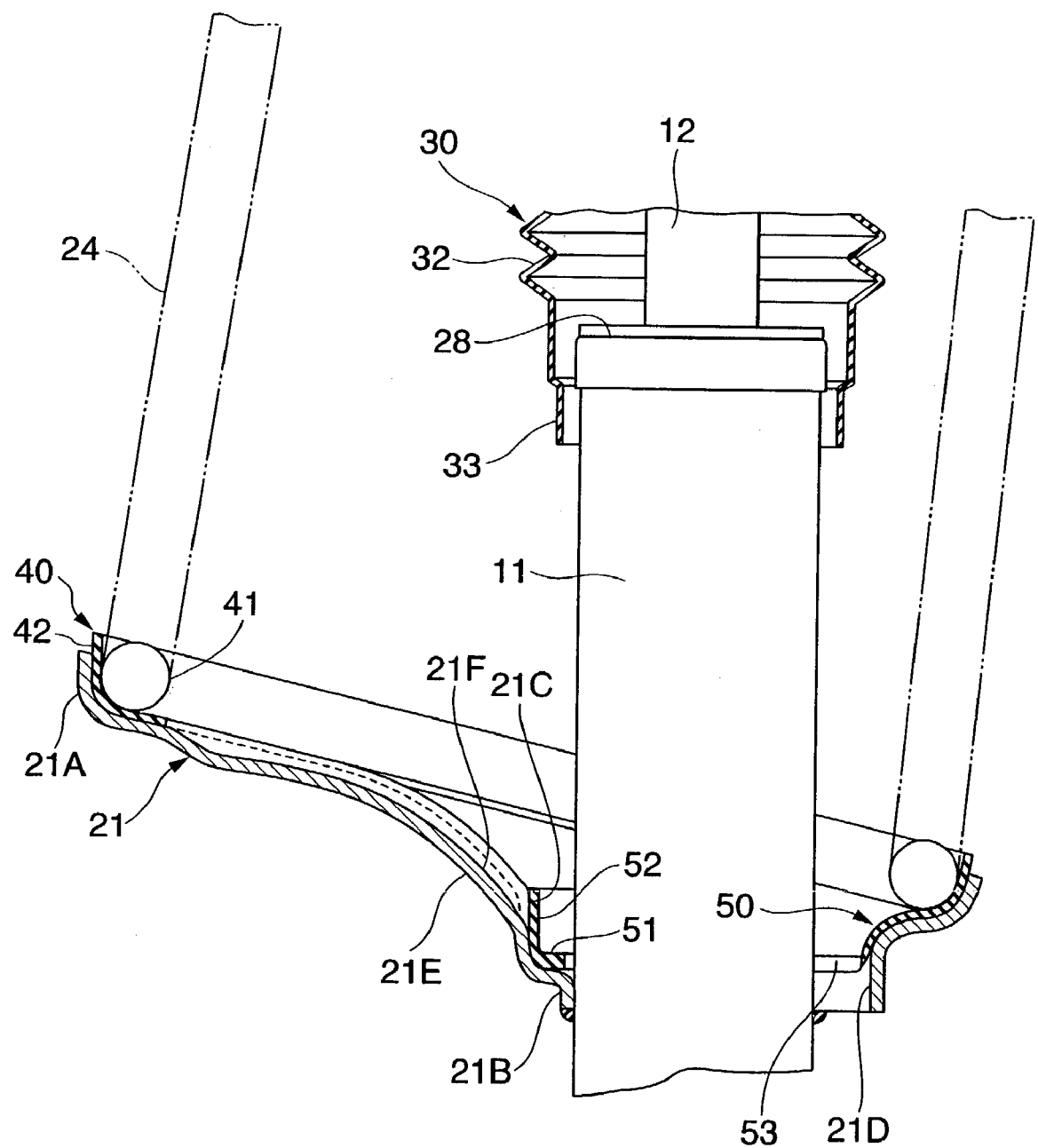
FIG. 2 is an enlarged view of an essential portion shown in FIG. 1.

As shown in FIGS. 1 and 2, in the hydraulic shock absorber 10, a seat rubber 40 is interposed between the suspension spring 24 and the lower spring seat 21. The cover-receiver 50 which is integrally formed with the seat rubber 40 is disposed on an upper surface of the spring seat 21, and the cover-receiver 50 receives an end surface of the dust cover 30. The seat rubber 40 and the cover-receiver 50 do not cover the entire surface of the spring seat 21. The seat rubber 40 covers an outer peripheral portion of the spring seat 21, and the cover-receiver 50 covers a central portion of the spring seat 21 closer to the damper tube 11.

Figure 3A:
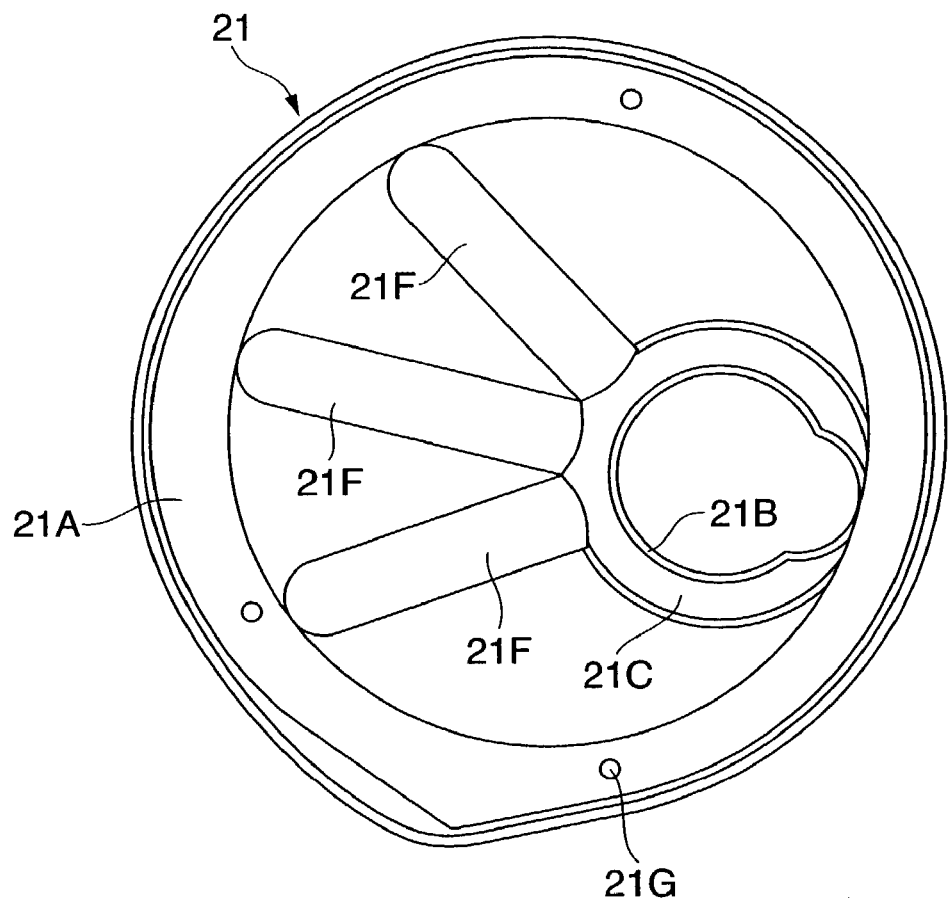
Figure 3B:
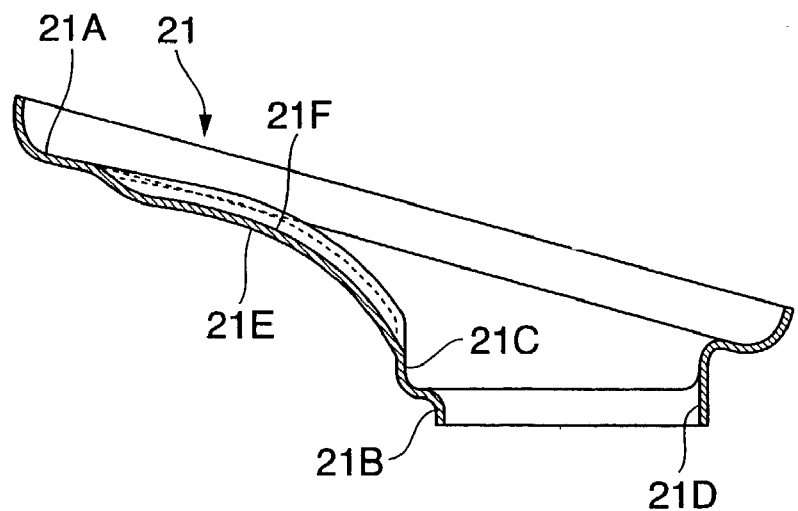

At that time, as shown in FIGS. 3A and 3B, the spring seat 21 supports an end surface of an end of the suspension spring 24 along one turn of the end surface of the suspension spring 24. The spring seat 21 includes a spring supporting portion 21A capable of restraining an outer diameter of the end of the suspension spring 24, and an annular mounting portion 21B fixed to an outer periphery of the damper tube 11. The annular mounting portion 21B is disposed inside the spring supporting portion 21A. The spring seat 21 includes a recessed engaging portion 21C which forms a fitting space of the cover-receiver 50 above the annular mounting portion 21B and around the damper tube 11. The annular mounting portion 21B and the recessed engaging portion 21C are provided with a weep hole 21D at a certain position of their circumferential direction surrounding the damper tube 11. The spring seat 21 includes a plurality of radial reinforcing ribs 21E formed inside the spring supporting portion 21A where the recessed engaging portion 21C is not provided, such that the reinforcing ribs 21E extend from the spring supporting portion 21A toward the recessed engaging portion 21C. A surface of the reinforcing rib 21E functions as a drainage 21F extending to an inner periphery of the recessed engaging portion 21C. Engaging holes 21G for the seat rubber 40 are provided at a circumferentially arranged plurality of positions of the spring supporting portion 21A.

The seat rubber 40 is made of an elastic body such as rubber or resin (e.g., NBR), and covers the spring supporting portion 21A of the spring seat 21. The seat rubber 40 comprises a seating portion 41 for directly supporting an end surface of an end of the suspension spring 24 along one turn of the end of the suspension spring 24, and a rising portion 42 rising from an outer periphery of the seating portion 41 for directly limiting an outer diameter of the end of the suspension spring 24. The seat rubber 40 includes lock pins 43 which are engaged with the engaging holes 21G of the spring seat 21. The lock pins 43 are located on a circumferentially arranged plurality of positions on a back surface of the seating portion 41.

Figure 4A:
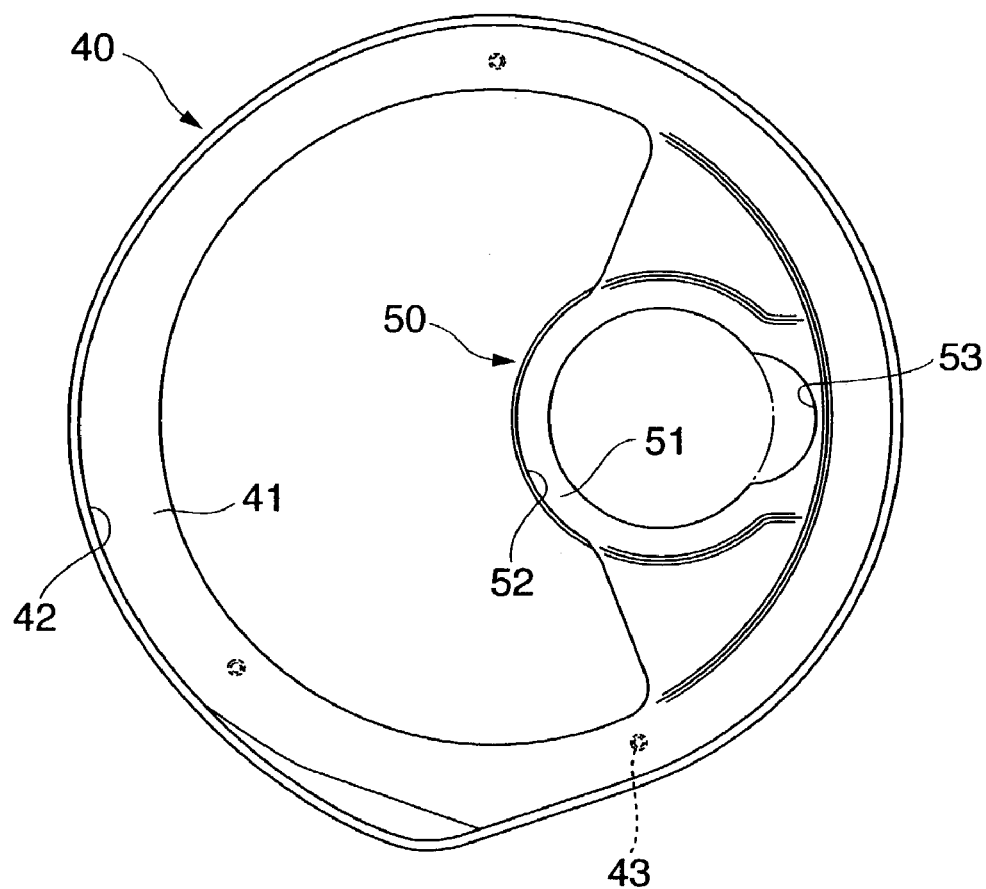
Figure 4B:
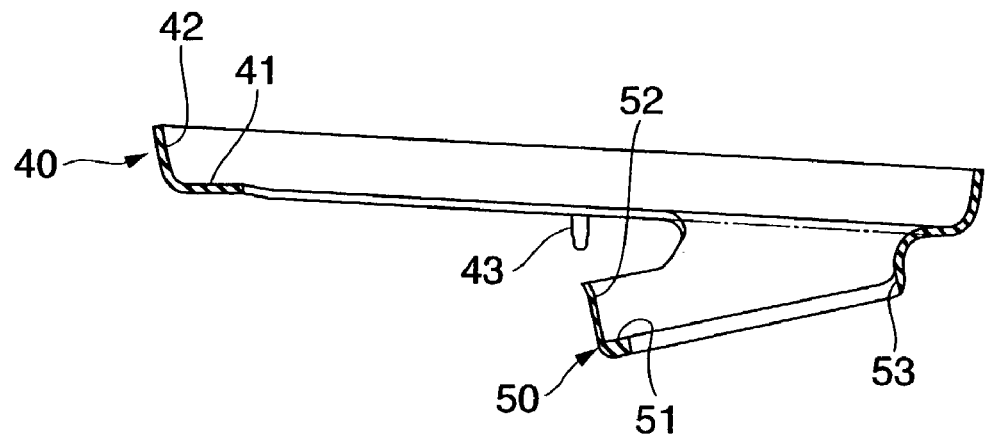

As shown in FIGS. 4A and 4B, the cover-receiver 50 is made of an elastic body of the same material as that of the seat rubber 40, such as rubber or resin. The cover-receiver 50 is integrally formed with a portion of the seating portion 41 of the seat rubber 40 in its circumferential direction. The cover-receiver 50 is substantially tightly engaged with and fixed to the recessed engaging portion 21C which is provided to surround the entire periphery of a tube abutting portion of the spring seat 21 without holding the outer periphery of the damper tube 11. The cover-receiver 50 comprises a flat receiving surface 51 disposed on a bottom of the recessed engaging portion 21C for receiving a lower end surface of the dust cover 30, and a raised portion 52 rising from an outer periphery of the flat receiving surface 51 along an inner surface of the recessed engaging portion 21C. The rising portion 52 of the cover-receiver 50 is fitted to the recessed engaging portion 21C of the spring seat 21 and is fixed in a state in which an outer diameter of the raised portion 52 is limited. The flat receiving surface 51 is formed at its position corresponding to the weep hole 21D of the spring seat 21 with a weep hole 53 by notching.

The drainage structure of the spring seat 21 will be explained. Water entering portions of the spring seat 21 which are not covered with the seat rubber 40 on the upper surface of the spring seat 21 and the cover-receiver 50 enter the recessed engaging portion 21C, which is the lowermost level of the spring seat 21 from the drainage 21F of the reinforcing rib 21E. Foreign matter such as sand flowing together with water do not enter the gap, and instead flow over an upper end edge of the raised portion 52 of the cover-receiver 50 together with the water, and flow out from the weep hole 21D of the spring seat 21 through the weep hole 53 of the cover-receiver 50.

A portion of the raised portion 52 of the cover-receiver 50 where the drainage 21F provided in the reinforcing rib 21E of the spring seat 21 corresponds to a portion which opens toward the recessed engaging portion 21C can be formed as a drainage (not shown), which is continuous with the drainage 21F, by notching. According to this arrangement, foreign matter such as sand can also flow out from the notched drainage without flowing over the upper end edge of the raised portion 52. It is necessary that the notching width along a circumferential direction of the notched drainage provided in the raised portion 52 is set to a sufficiently small width such that the dust cover 30 which abuts against the cover-receiver 50 does not slide with respect to an inner periphery of the recessed engaging portion 21C of the spring seat 21.

Therefore, in the hydraulic shock absorber 10, the dust cover 30 vertically moves as the piston rod 12 expands and contracts. When the piston rod 12 expands, the hanging portion 33 of the dust cover 30 is allowed to separate from the flat receiving surface 51 of the cover-receiver 50. The periphery of the damper tube 11 is allowed to move upward near the bump stopper cap 28 to extend the bellows portion 32. When the piston rod 12 contracts, the hanging portion 33 of the dust cover 30 is allowed to abut against the flat receiving surface 51 of the cover-receiver 50 to compress the bellows portion 32.

According to the invention, the following effects can be obtained.

(1) The cover-receiver 50 is fitted and fixed to the engaging portion 21C provided on the spring seat 21 without holding the damper tube 11. Therefore, the cover-receiver 50 is inserted into the damper tube 11 and does not slide. Thus, assembling performance is excellent.

(2) The cover-receiver 50 is fixed to the spring seat 21 and is not deformed and deviated out of position by the collision force against the end surface of the dust cover 30. Therefore, the cover-receiver 50 does not scratch off the coating on the surface of the spring seat 21, rust is not generated on the surface of the spring seat 21, and the surface of the spring seat 21 is protected.

(3) The cover-receiver 50 is fitted and fixed tightly along the spring seat 21. Therefore, foreign matter such as sand is not sandwiched between the cover-receiver 50 and the spring seat 21. Foreign matter such as sand does not scratch off the coating on the surface of the spring seat 21, rust is not generated on the surface of the spring seat 21, and the surface of the spring seat 21 is protected.

(4) If a thickness of the cover-receiver 50 is increased to enhance its rigidity, it is possible to further prevent the cover-receiver 50 from being deformed by collision against the dust cover 30. Therefore, the assembling performance can be enhanced further.

(5) By integrally forming the cover-receiver 50 and the seat rubber 40 with each other, management of parts is facilitated and the number of assembling steps can be reduced.

(6) The cover-receiver 50 is provided such as to extend over the entire portion of the spring seat 21 against which the dust cover abuts. Therefore, even if the dust cover 30 is inclined, the end surface of the dust cover 30 is reliably received, and the end surface of the dust cover 30 is reliably prevented from abutting against the spring seat 21.

Figure 5:
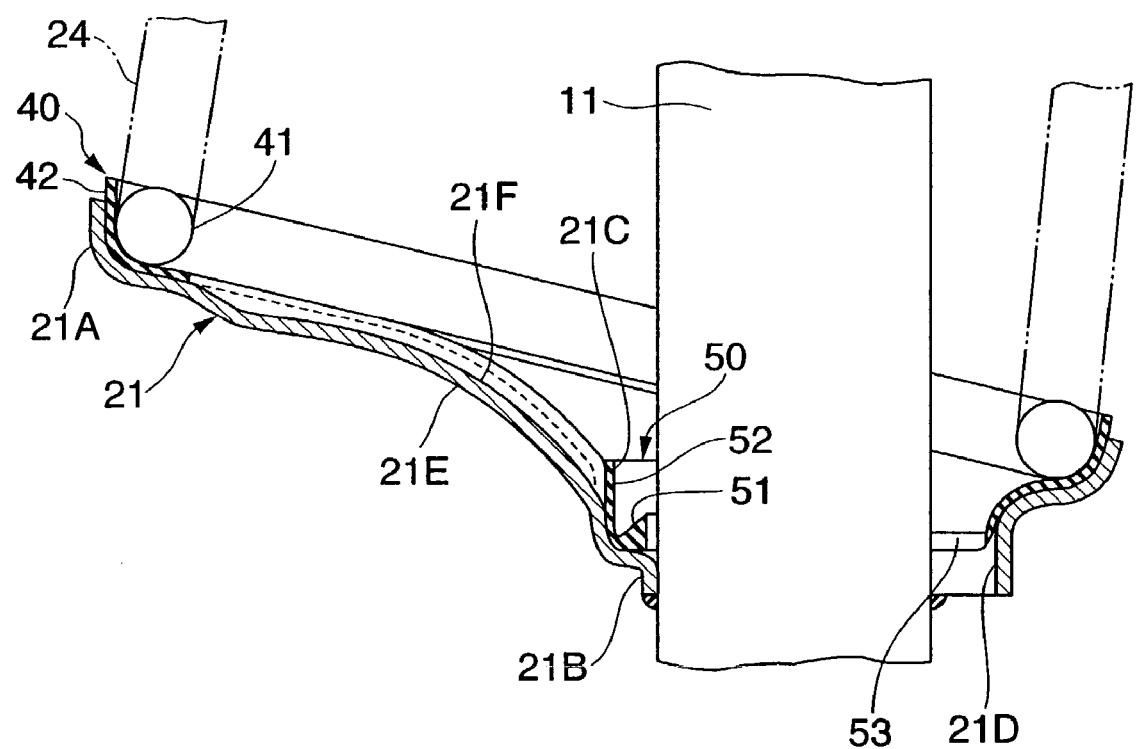
FIG. 5 is a sectional view showing a modification of the cover-receiver.

In FIG. 5, a receiving surface 51 of the cover-receiver 50 is tapered such that the receiving surface 51 becomes lower radially outward (toward the raised portion 52) with respect to the dust cover 30.

(7) The tapered receiving surface 51 provided on the cover-receiver 50 guides an end surface of the downwardly moving dust cover 30, and coaxially centers the dust cover 30 with the damper tube 11. Since the hydraulic shock absorber 10 is inclined with respect to the vertical direction, the dust cover 30 moves vertically in a slightly inclined manner with respect to the damper tube 11. However, when the dust cover 30 starts abutting against the cover-receiver 50, the dust cover 30 is centered so that it is prevented from being bent. It is possible to prevent the dust cover 30 from being contacted with the suspension spring 24 and the damper tube 11, and to prevent resultant damage.

While the preferred embodiments of the invention have been described in detail with reference to the drawings, they are by no means limitative, and various changes and modifications are possible without departing from the scope and spirit of the invention. For example, the shape of the engaging portion provided on the spring seat for fitting and fixing the cover-receiver is not limited to the recessed shape, and the engaging portion has a projection. The dust cover receiving structure of the shock absorber of the invention is not limited to application to a hydraulic shock absorber, and may be applied to various shock absorbers.

According to the present invention, as described above, the assembling performance of the cover-receiver which receives the end surface of the dust cover is enhanced. Foreign matter such as sand is prevented from sliding with respect to the surface of the spring seat to protect the surface of the spring seat.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as being limited to the specific embodiment set out above, but should be understood to include all possible embodiments which can be embodied within a scope encompassed and equivalents thereof with respect to the features set out in the appended claims.

What is claimed is:

1. A dust cover receiving structure adapted for use with a shock absorber comprising:
   a dust cover covered with a damper tube having one end fixed to a piston rod,
   a suspension spring disposed outside the dust cover and being supported by a spring seat mounted to the damper tube, said spring seat comprising a spring supporting portion that supports an end surface of an end of the suspension spring to limit an outer diameter of the endof the suspension spring, an annular mounting portion disposed inside the spring supporting portion and fixed to an outer periphery of the damper tube, and a recessed engaging portion which forms a fitting space of a cover-receiver above the annular mounting portion and around the damper tube, said recessed engaging portion proximate to said mounting portion and spaced from said spring supporting portion,
   the cover-receiver for receiving the other end surface of the dust cover, the cover-receiver being disposed on an upper surface of the spring seat,
   the cover receiver comprising a receiving surface disposed on a bottom of the recessed engaging portion and a raised portion rising from an outer periphery of the receiving surface along an inner surface of the recessed engaging portion,
   wherein without holding the damper tube the cover-receiver is engaged with and fixed to the recessed engaging portion in a state in which an outer diameter of the raised portion is limited.

2. A dust cover receiving structure according to claim 1, wherein a seat rubber is interposed between the suspension spring and the spring seat, the cover-receiver being integrally formed with the seat rubber.

3. A dust cover receiving structure according to claim 1, wherein the cover-receiver is arranged and constructed to surround a periphery of a portion of the spring seat against which the dust cover abuts.

4. A dust cover receiving structure according to claim 2, wherein the cover-receiver is arranged and constructed to surround a periphery of a portion of the spring seat against which the dust cover abuts.

5. A dust cover receiving structure according to claim 1, wherein the receiving surface of cover-receiver is tapered.

6. A dust cover receiving structure according to claim 2, wherein the receiving surface of cover-receiver is tapered.

7. A dust cover receiving structure according to claim 3, wherein the receiving surface of cover-receiver is tapered.

8. A dust cover receiving structure according to claim 4, wherein the receiving surface of cover-receiver is tapered.

9. A dust cover receiving structure according to claim 1, wherein the dust cover further comprises a mounting portion fixed to the piston rod, a bellows portion which is continuous with the mounting portion, and a cylindrical hanging portion provided on a lower end of the bellows portion.

10. A dust cover receiving structure according to claim 1, wherein the spring seat further comprises engaging holes disposed at a plurality of positions of the spring supporting portion, and a seat rubber having lock pins which retained with the engaging holes of the spring seat are disposed at a plurality of positions of a back surface of a seating portion which directly supports an end surface of an end of the suspension spring.

11. A dust cover receiving structure according to claim 10, wherein at least one spring seat weep hole is provided at a point along a circumferential direction surrounding the damper tube, and at least one notch-shaped weep hole is provided in the flat receiving surface of the cover-receiver at a position corresponding to the weep hole of the spring seat.

12. A dust cover receiving structure according to claim 11, wherein the spring seat further comprises a plurality of radial reinforcing ribs extending from the spring supporting portion toward the recessed engaging portion, surfaces of the reinforcing ribs arranged and constructed to form a drainage extending to an inner periphery of the recessed engaging portion.

* * * * *